J. B. ADT.
STARCH COOLER.
APPLICATION FILED MAY 24, 1917.
1,255,842.
Patented Feb. 12, 1918.
4 SHEETS—SHEET 1.
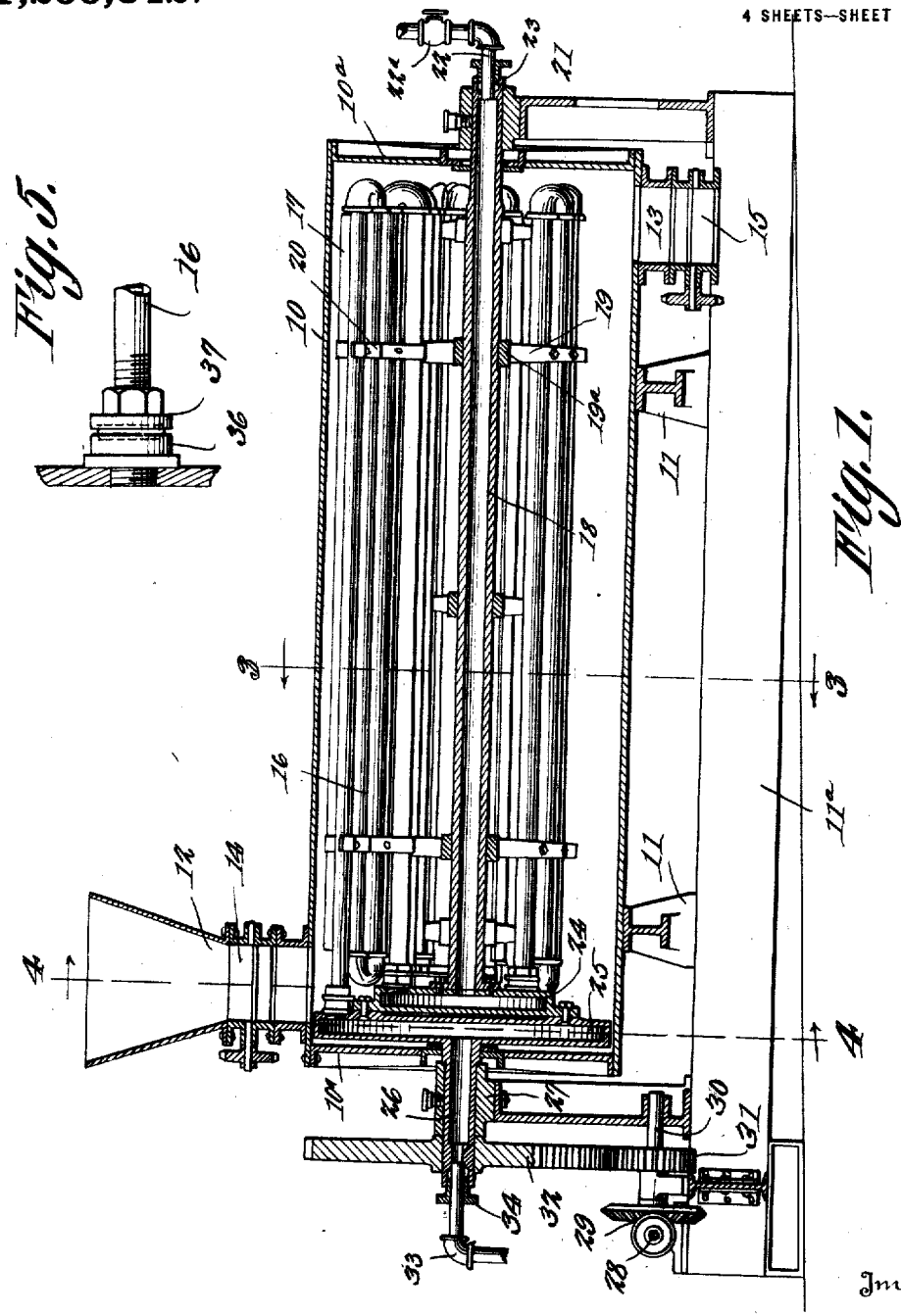
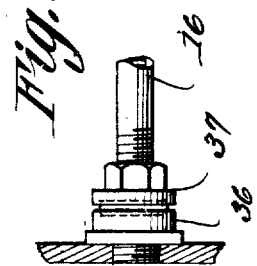
Fig. 5.
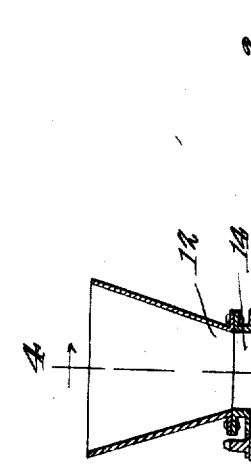
Fig. 1.
Inventor
John B. Adt.
By Henry G. Brewington.
Attorney

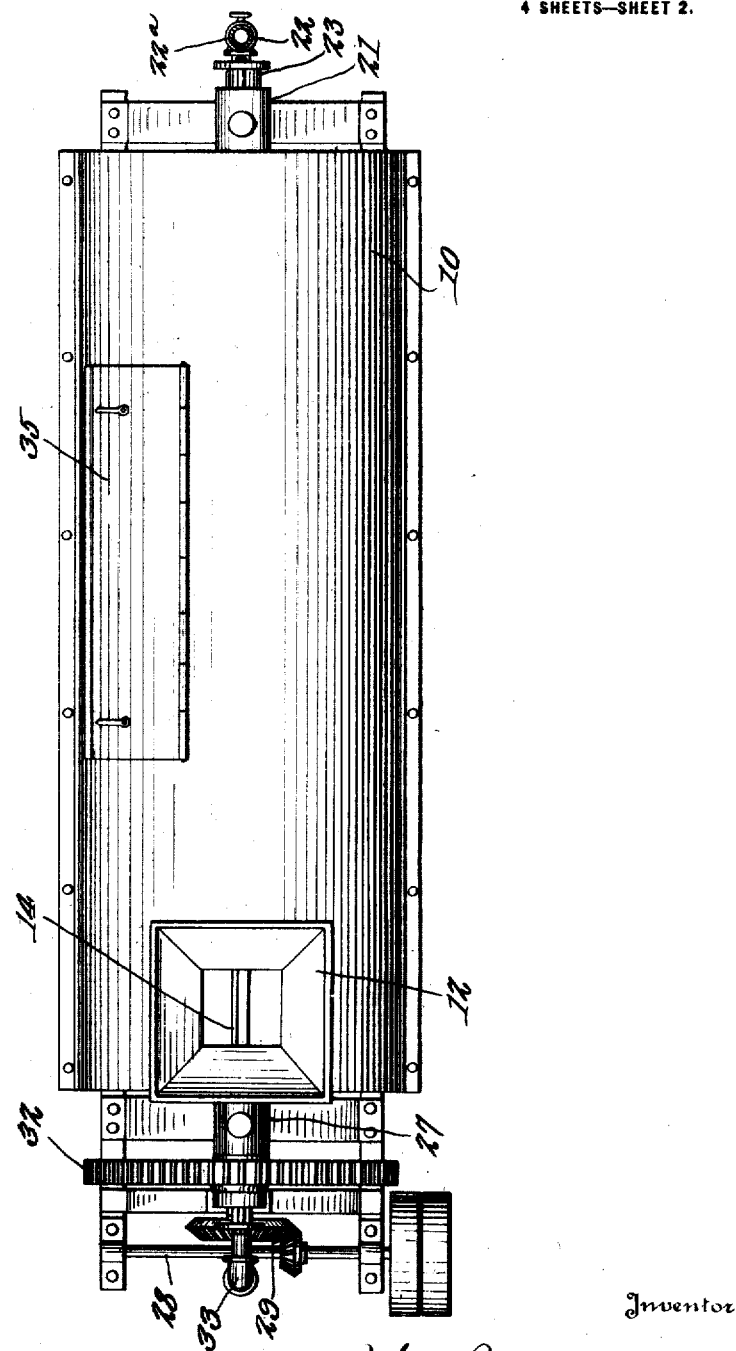

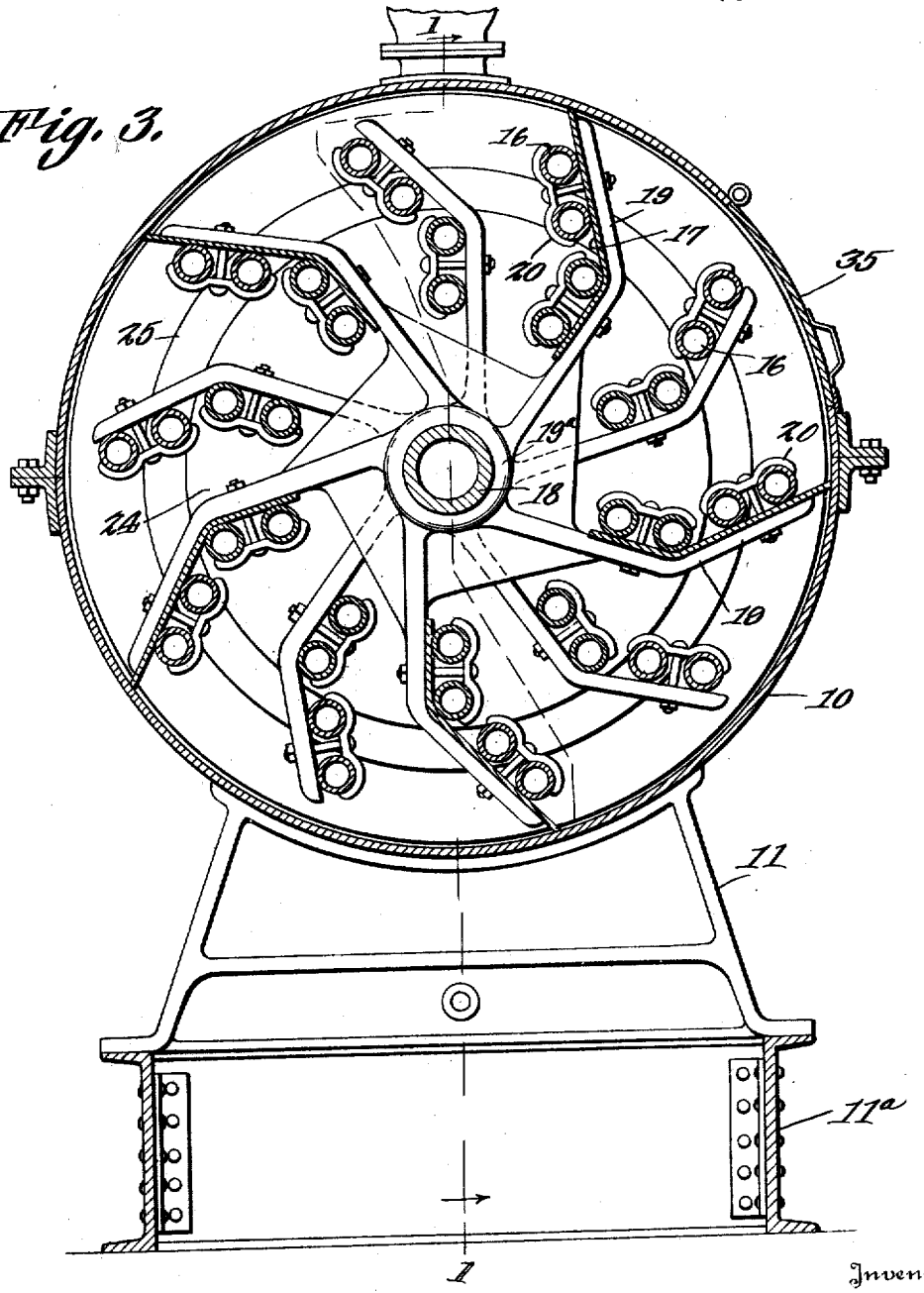

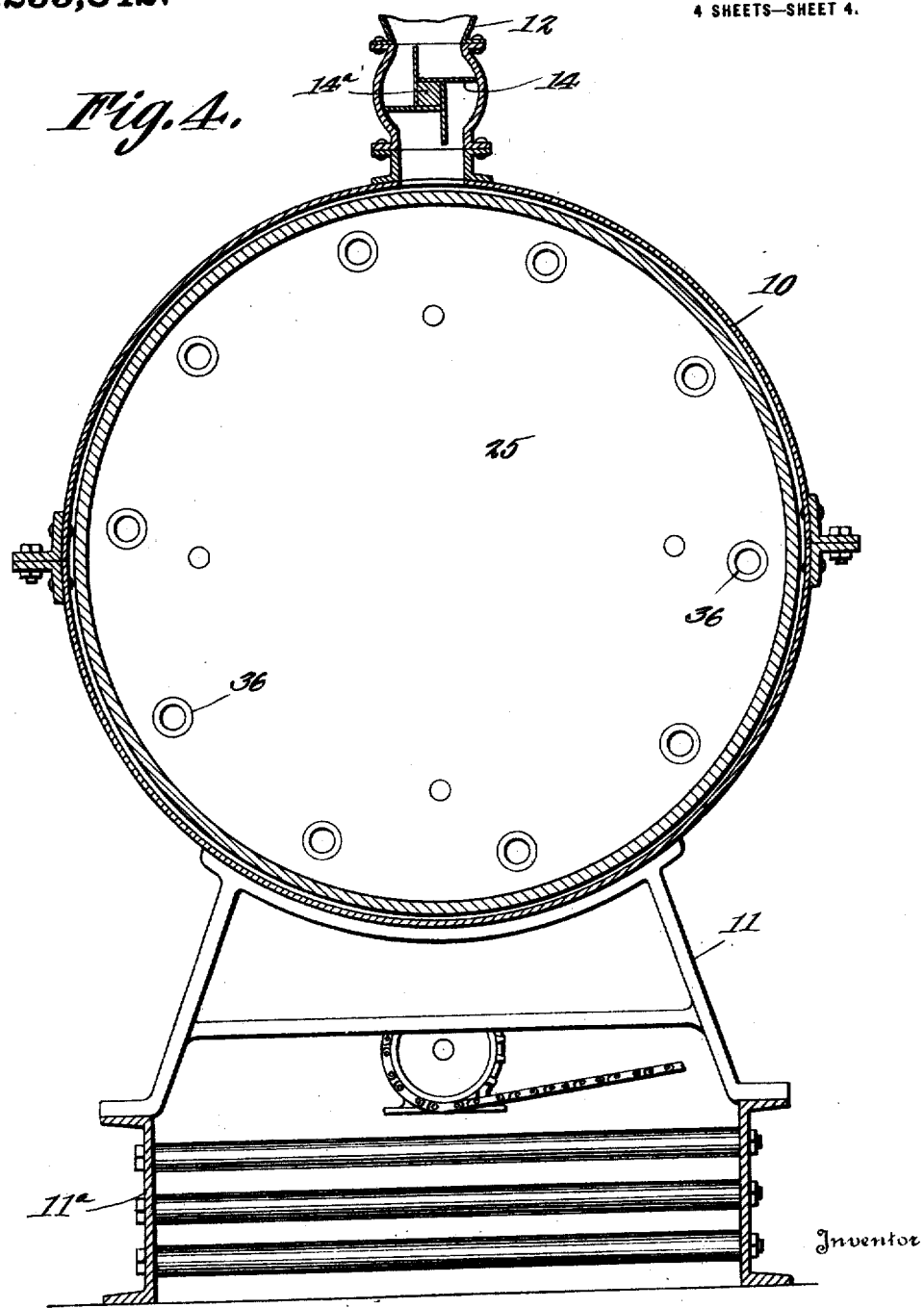

UNITED STATES PATENT OFFICE.

JOHN B. ADT, OF BALTIMORE, MARYLAND.

STARCH-COOLER.

1,255,842.

Specification of Letters Patent.

Patented Feb. 12, 1918.

Application filed May 24, 1917. Serial No. 170,794.

*To all whom it may concern:*

Be it known that I, JOHN B. ADT, a citizen of the United States, residing at Baltimore city, State of Maryland, have invented certain new and useful Improvements in Starch-Coolers, of which the following is a specification.

The apparatus which is the subject-matter of the present application for patent is designed for cooling starch as it comes from the drier, and its object is to provide a simple and efficient cooling apparatus which is so constructed that the material, when passing therethrough, is entirely cut off from the outside air, thereby effectually preventing foreign matter, usually present in the air, from mixing with the starch.

The invention also has for its object to provide a novel and improved agitator for the starch as it passes through the apparatus, with a cooling device associated therewith, as will be described in detail hereinafter.

Other objects and advantages of the invention will be pointed out in the detailed description hereinafter, and in order that the structure may be fully understood, reference is had to the accompanying drawings.

In the drawings—

Figure 1 is a central longitudinal section of the apparatus on the line 1—1 of Fig. 3;

Fig. 2 is a plan view thereof;

Fig. 3 is an enlarged cross-section on the line 3—3 of Fig. 1;

Fig. 4 is a similar section on the line 4—4 of Fig. 1, and

Fig. 5 is a detail.

Referring specifically to the drawings, 10 denotes a cylindrical drum closed at its ends by heads 10$^a$, and supported in stationary position on suitable stands 11 mounted on a base 11$^a$. The drum is set so that it is inclined somewhat in the direction of its length. To the higher end of the drum, at the top thereof, is connected a charging hopper 12 and to the lower end of the drum, at the bottom, is connected an outlet duct 13. In the discharging end of the hopper is mounted a rotary valve comprising a series of wings 14 radiating from a central hub 14$^a$. The valve wings are so dimensioned and arranged that in certain positions of the valve, two opposite ones of the wings extend across the hopper and effect a complete closure thereof, as shown in Fig. 4. A similar valve 15 is mounted in the outlet duct 13.

Thus, it will be seen that when the two valves are closed, the inside of the drum is completely shut off from the outside air, and all air or foreign matter is prevented from passing through the drum.

In the drum 10 is located a rotary agitating and cooling element composed of a series of return bend coils 16 extending in the direction of the length of the drum, and paddles 17 extending parallel thereto. A hollow shaft 18 extends lengthwise and centrally through the drum and carries at suitable intervals supports for the coils, these supports being spider arms 19 radiating from a hub 19$^a$ fixed on the shaft. By suitable clamps 20 the coils are rigidly secured to the spider arms. The paddles are associated with alternate ones of the coils, they being also carried by the spider arms and secured thereto by the clamps 20.

The shaft 18 passes at one end through one of the heads 10$^a$ and is here supported on the outside of the drum, in a bearing 21. This end of the shaft has a connection with a supply pipe 22 for a cooling medium which may be water, said pipe being provided with a controlling valve 22$^a$. The end of the shaft 18 has a stuffing box 23 through which the pipe 22 extends.

Adjacent to the other head 10$^a$ of the drum 10, inside the latter, are two headers 24 and 25, respectively, to which the coils 16 are connected in a manner to be presently described. These two headers are bolted or otherwise fastened together, and the header 25 is next to the drum end or head 10$^a$ and has a central tubular or hollow shaft extension 26 which passes through said head and is journaled on the outside of the latter in a bearing 27. The shafts 18 and 26 are in axial alinement, and upon applying power to the latter to rotate the same, the coils 16 and the paddles 17 are revolved in the drum 10.

The shaft 26 is operated from a drive shaft 28 obtaining power from any suitable source, and connected by a bevel gearing 29 to a short countershaft 30 having a pinion 31 which is in mesh with a spur gear 32 on the shaft 26.

To the outer end of the shaft 26 is connected an outlet pipe 33 for the cooling medium, and a stuffing box 34 is also provided.

Each coil 16 is connected at one end to the header 24 and at the other end to the header 25, the first mentioned end being the inlet end, and the other the outlet end. The inner end of the shaft 18 is connected to the center of the header 24 to discharge thereinto. It will therefore be seen that the cooling medium entering the shaft 18 flows through the same into the header 24, from which it passes into the coils 16, and after circulating through the latter it passes into the outlet header 25 and is discharged from the latter through the shaft 26 and the pipe 33.

Each bank of coils 16 consists of four pipes connected by bends or elbows to form one continuous passageway for the cooling medium. The inlet and outlet connections of the coils are at one and the same end, and as these connections are made with the headers 24 and 25, the diameter of the former is less than that of the latter. Each one of the spider arms 19 carries a bank of coils as shown in Fig. 3, and said arms are curved in the direction of their length or deflected sidewise near their outer ends, the coils being correspondingly arranged so that they are presented squarely to the material in the drum 10.

The drum 10 is also provided with a side door 35 so that access to its interior may be had.

Fig. 5 shows how the coils 16 are connected to the headers 24 and 25, the latter carrying nipples 36 to which the ends of the pipes forming the coils are connected by coupling nuts 37.

Any suitable means may be provided for operating the valves in the inlet hopper 12 and the outlet duct 13.

The starch is fed into the hopper 12 and allowed to flow into the drum 10 through the rotating inlet valve and after passing through the drum it is discharged into the outlet duct 13 past the valve 15 therein. As hereinbefore described, the valves form a complete closure for the drum, to exclude air and foreign matter. Fig. 4 clearly illustrates the operation of the valves. Two opposite valve wings are shown extending across the hopper, and before these wings swing away from closing position, the next pair of wings comes into closing position. The starch is fed into the drum and leaves the same in small quantities and it therefore passes through the drum slow enough to be cooled. The paddles 17 and the coils agitate the starch as it passes through the drum, it being continually elevated and allowed to flow from the paddles over the coils below. Thus every particle of the starch is brought into contact with the coils and the entire mass of starch is promptly and thoroughly cooled.

While the apparatus is designed more particularly for cooling starch, it will be understood that it is not limited to such material, and it will also be evident that various changes and modifications in the structural details shown and described may be made without a departure from the spirit and scope of the invention as claimed hereinafter. The apparatus can also be used for heating and drying material by passing a heating medium through the coils.

I claim:

1. A material tempering apparatus comprising a stationary drum, axially alined hollow shafts entering the ends of the drum, one of said shafts passing through the drum from one end and terminating at its inner end adjacent to the other end, a header connected to the inner end of the last mentioned shaft, a header connected to the inner end of the other shaft, bearings on the outside of the drum in which the shafts are rotatably supported, one of the shafts having an inlet for a tempering medium and the other shaft having an outlet for said medium, driving means for the shafts, and coils carried by the first mentioned shaft inside the drum, each of said coils having one end connected to one of the headers and the other end to the other header.

2. A material tempering apparatus comprising a stationary drum, axially alined hollow shafts entering the ends of the drum, one of said shafts passing through the drum from one end and terminating at its inner end adjacent to the other end, a header connected to the inner end of the last mentioned shaft, a header connected to the inner end of the other shaft, bearings on the outside of the drum in which the shafts are rotatably supported, one of the shafts having an inlet for a tempering medium and the other shaft having an outlet for said medium, driving means for the shafts, coils carried by the first mentioned shaft inside the drum, each of said coils having one end connected to one of the headers and the other end to the other header, and agitating blades associated with the coils and movable therewith.

3. A material tempering apparatus comprising a stationary drum, axially alined hollow shafts entering the ends of the drum, one of said shafts passing through the drum from one end and terminating at its inner end adjacent to the other end, a header connected to the inner end of the last mentioned shaft, a header connected to the inner end of the other shaft, bearings on the outside of the drum in which the shafts are rotatably supported, one of the shafts having an inlet for a tempering medium and the other shaft having an outlet for said medium, driving means for the shafts, spider arms fastened to the first mentioned shaft inside the drum and extending radially from the shaft, and coils supported by said arms, each of said coils having one end connected to one of the headers and the other end to the other header.

4. A material tempering apparatus comprising a stationary drum, axially alined hollow shafts entering the ends of the drum, one of said shafts passing through the drum from one end and terminating at its inner end adjacent to the other end, a header connected to the inner end of the last mentioned shaft, a header connected to the inner end of the other shaft, bearings on the outside of the drum in which the shafts are rotatably supported, one of the shafts having an inlet for a tempering medium and the other shaft having an outlet for said medium, driving means for the shafts, spider arms fastened to the first mentioned shaft inside the drum and extending radially from the shaft, coils supported by said arms, each of said coils having one end connected to one of the headers and the other end to the other header, and agitating blades carried by the arms and extending parallel to the coils.

5. A material tempering apparatus comprising a stationary drum having inlet and outlet passages for the material, rotary valves in said passages, each of said valves comprising a central hub and wings radiating therefrom, the length of the wings being such that opposite ones thereof reach across the passages for shutting off the interior of the drum from the external atmosphere, and a revoluble tempering and agitating element in the drum.

In testimony whereof I affix my signature in the presence of two witnesses.

JOHN B. ADT.

Witnesses:
E. WALTON BREWINGTON,
HOWARD D. ADAMS.

Copies of this patent may be obtained for five cents each, by addressing the "Commissioner of Patents, Washington, D. C."